United States Patent [19]
Ranoia et al.

[11] Patent Number: 5,491,014
[45] Date of Patent: Feb. 13, 1996

[54] NON-SLIP FILM LEADER

[76] Inventors: Vincent J. Ranoia, 504 Westbourne Cir.; Joseph J. Ranoia, 114 Acadamy La., both of Broomall, Pa. 19008

[21] Appl. No.: 401,085

[22] Filed: Mar. 8, 1995

Related U.S. Application Data

[63] Continuation of Ser. No. 159,549, Dec. 1, 1993, abandoned, which is a continuation-in-part of Ser. No. 867,824, Apr. 13, 1992, abandoned.

[51] Int. Cl.⁶ .............................. B32B 3/00; B32B 23/02
[52] U.S. Cl. .......................... 428/156; 428/120; 428/141; 428/157; 428/192; 428/212
[58] Field of Search ..................... 428/156, 192, 428/212, 906, 119, 120, 81, 141, 167

[56] References Cited

U.S. PATENT DOCUMENTS 3,502,765  3/1970  Spencer .................................. 264/230
4,021,179  5/1977  Pira et al. ............................... 425/369

*Primary Examiner*—Donald J. Loney
*Attorney, Agent, or Firm*—Eugene E. Renz, Jr.

[57] ABSTRACT

A film leader device for use with microfilm, comprising an elongated generally rectangular strip of plastic material having generally parallel opposing side edges and top and bottom faces. Knurling of a predetermined pattern is formed on at least a portion of the top face and cover the area adjacent one side edge thereof. Knurling of a predetermined pattern is also formed on at least a portion of the lower face extending along the opposing edge.

6 Claims, 6 Drawing Sheets

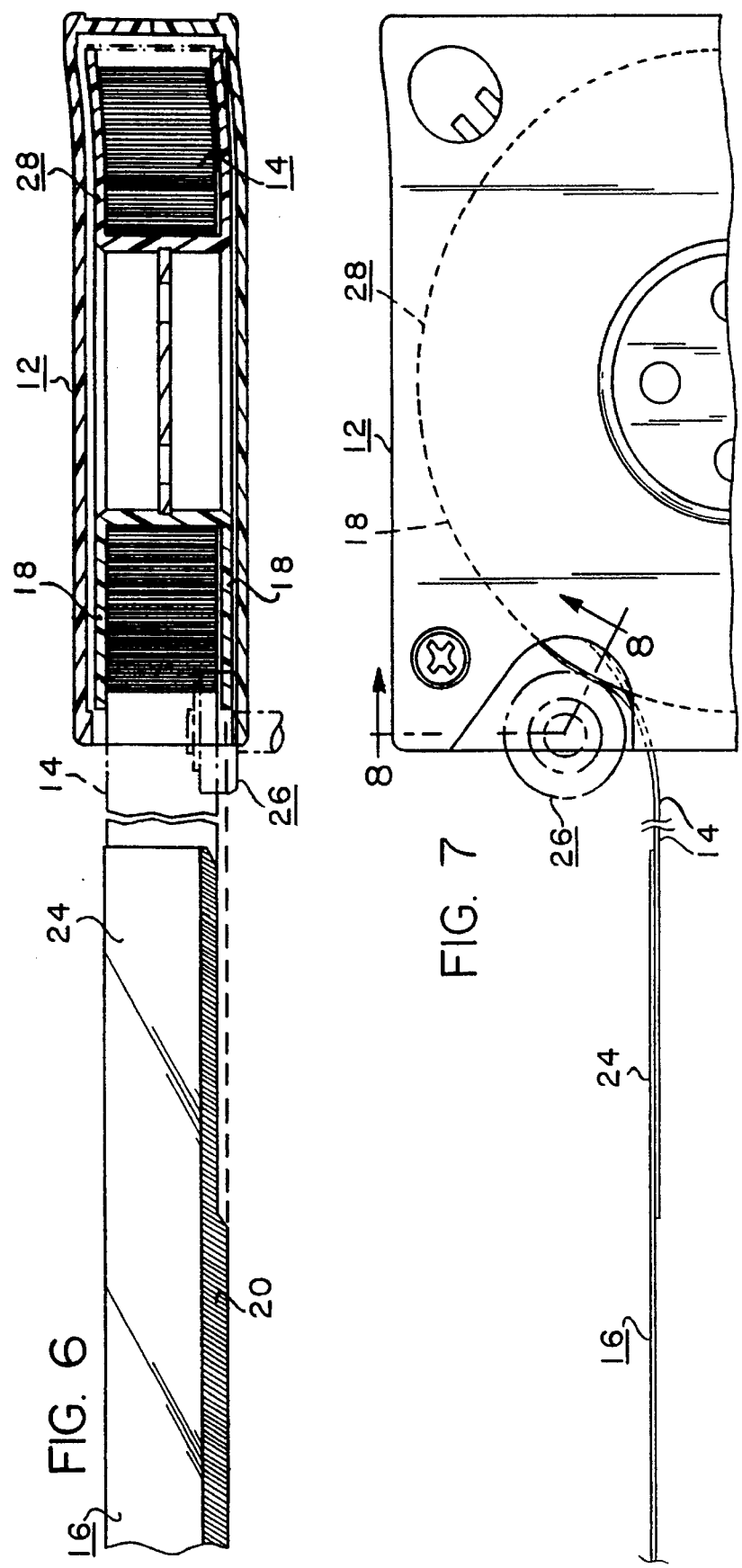

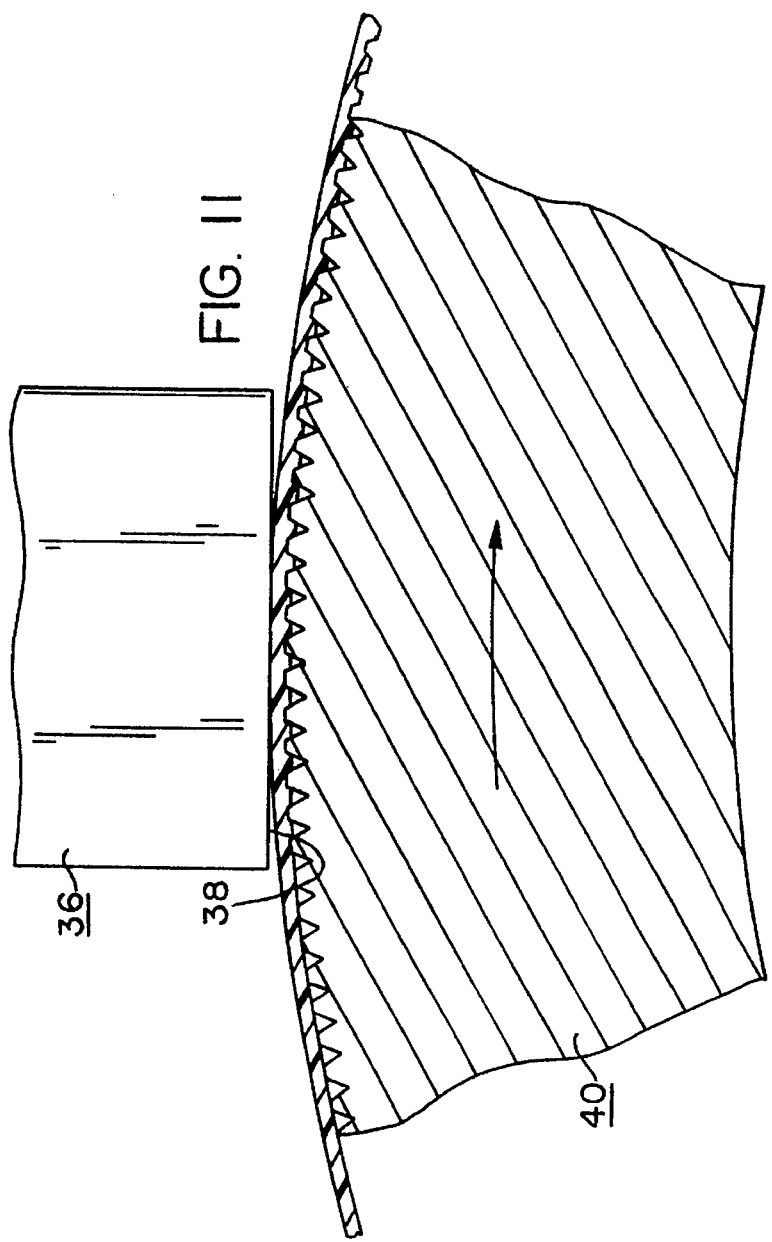
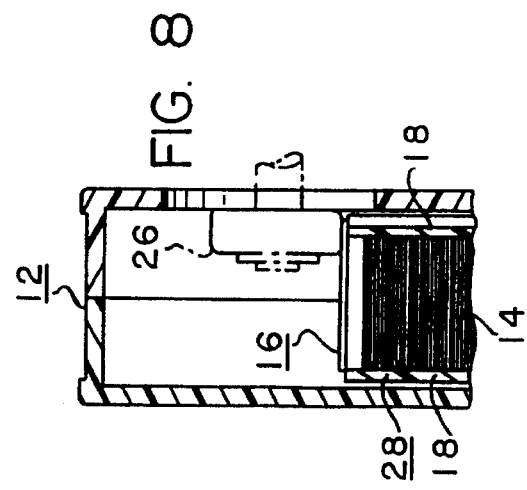

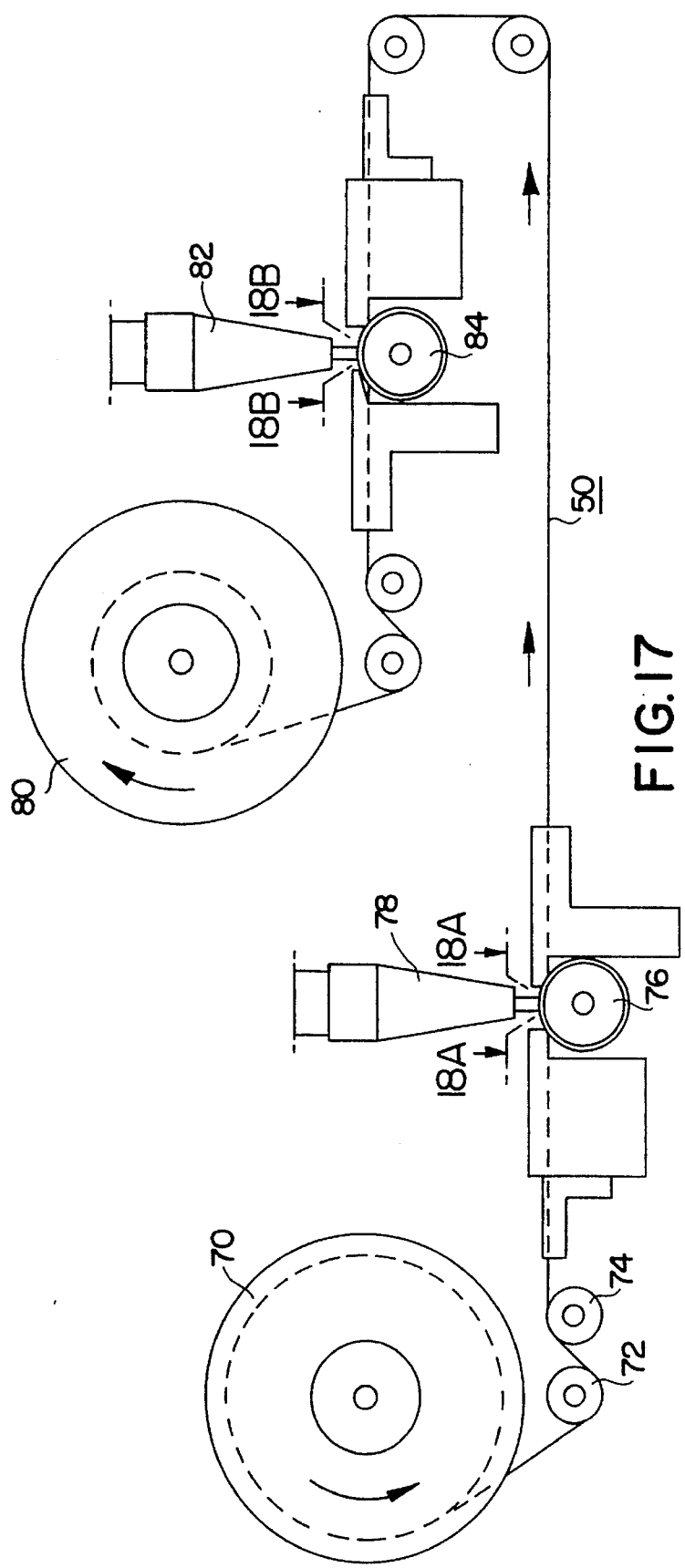
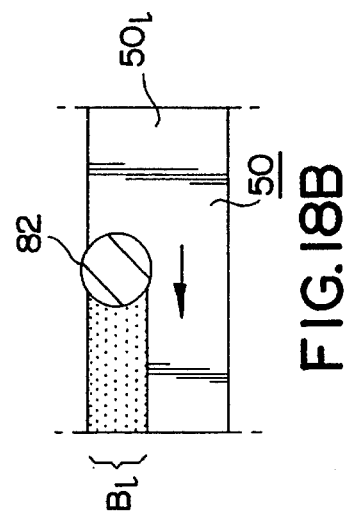

NON-SLIP FILM LEADER

This is a continuation of application(s) Ser. No. 08/159,549 filed on Dec. 1, 1993 now abandoned which is a continuation-in-part of application Ser. No. 07/867,824 filed on Apr. 13, 1992, now abandoned.

FIELD OF THE INVENTION

This invention relates to film leaders generally, and particularly to non-slip film loading leaders for use with microfilm and self loading microfilm reader/printers, and the process of ultrasonically knurling these non-slip film loading leaders.

BACKGROUND OF THE INVENTION

Microfilm reader/printers have gained universal acceptance as a method for retrieving and making copies of information stored on microfilm. For example, many governmental and legal records are now stored on microfilm, and many libraries store archival newspaper editions on microfilm for compact storage and quick and efficient retrieval. Such storage media allow for large amounts of records and data to be stored in a relatively small space.

The microfilm is stored on reels within relatively compact, generally four inch square cartridges which are approximately 1" deep. A starter leader is attached to the hub of the reel contained within the cartridge and then the microfilm is attached to the starter leader. The microfilm is then wound round the cartridge reel. The free-end of the microfilm is then attached to the tab of a loading leader generally made of polyester. While the starter leader, microfilm, and the tab of the loading leader are all sufficiently narrow to be wound round the hub of the cartridge reel between the opposing radial walls of the reel, the body of the loader leader is of sufficient width so as to rest upon the exterior radial walls of the reel and thus engage the reels on the outside of the reel's radial walls. One end of the cartridge has an opening through which the free-end of the loading leader, and subsequently the microfilm itself, passes to be loaded into the appropriate microfilm reader/printer to allow viewing of the material on the microfilm. By storing the microfilm on a reel which itself is mounted within such a closed cartridge, the microfilm is protected from direct sun light, dust, dirt and excessive handling by the operator.

The cartridge is inserted into the loading cavity of the microfilm reader/printer and the operator then causes the free-end of the loading leader to be automatically loaded onto the take-up reel of the microfilm reader/printer. A loading wheel, generally made of rubber, contacts one edge of the loading leader and presses the loading leader against one of the radial walls of the cartridge reel. The loading wheel rotates, engages the loading leader, and causes the loading leader and cartridge opening reel to rotate so as to expose the free-end of the loading leader which then guides out of the cartridge opening and onto the take-up reel of the reader/printer. The reader/printer take-up reel has radially extending ribs along the interior of its radial walls which frictionally engage the loading leader. The loading wheel and the take-up reel on the reader/printer rotate together such that the free-end of the loading leader is engaged by the reader/printer take-up reel as the loading wheel causes more of the loading leader to be inserted onto the take-up reel. Once enough of the loading leader is sufficiently frictionally engaged by the ribs of the take-up reel to allow further take-up and loading by the take-up reel itself, the operator disengages the loading wheel mechanism.

Most prior art loading leaders are formed of smoothed surfaced, untreated polyester. A prevalent problem with such smooth surface polyester leaders is excessive slippage between the loading wheel and loading leader which makes cartridge loading time consuming. Slippage for such untreated polyester loading leaders can occur up to 50% of the time.

Another prior art loading leader is emulsion treated on one side to increase the frictional engagement between the loading wheel and the loading leader during loading of the microfilm. However, the slippage for these emulsion treated loading leaders still occurs up to 25% of the time. Also, when the loading leaders are initially attached to the microfilm, care must be exercised to ensure that the exposed emulsion side of the leader will be presented to the loading wheel. These emulsion treated loading leaders are manufactured so as to produce a pronounced bow in the loading leader so that the assembler of the microfilm cartridge can distinguish the emulsion side. However, if the bow is not pronounced, the assembler must wet the emulsion treated loading leader to determine the emulsion side so that he or she may properly attach the loading leader to the microfilm during assembly of the cartridge. This increases overall cartridge assembly time, thus increasing cost of assembly.

An object of the present invention is to provide a non-slip film loading leader which virtually eliminates slippage upon loading of the microfilm into a microfilm reader/printer.

It is a further object of the present invention to provide a non-slip film loading leader which may be attached to the microfilm on either surface of the leader and which will still provide a non-slip contact between the loading leader and the loading mechanism of the microfilm reader/printer.

It is also an object of the present invention to provide an economical and efficient process for ultrasonically knurling the loading leaders so as to produce a non-slip surface.

SUMMARY OF THE INVENTION

It has now been discovered that the objects of the present invention can be accomplished in the following manner. Specifically, a non-slip film loading leader has been discovered which virtually eliminates slippage during loading of microfilm into microfilm readers/printers. Also, the process for manufacturing these non-slip film loading leaders has been discovered which allows efficient, rapid, and economical knurling of these non-slip film loading leaders.

The non-slip loading leader of the present invention consists of a standard polyester, or other thermoplastic, film leader which is knurled on at least one edge along a substantial length of the loading leader. The non-slip loading leader is of sufficient thickness to allow the leader to be semi-rigid. The non-slip loading leader has knurls in a predetermined pattern such that a frictional, non-slip engagement is obtained between the non-slip loading leader and the loading wheel of the microfilm reader/printer. The pattern of the knurls for the preferred embodiment is diagonal, and begins at the edge of the non-slip loading leader and continue for approximately 25% of the width and along virtually the entire length of the non-slip loading leader. Other knurled or roughened patterns are also possible. In the preferred embodiment, both ends of the non-slip loading leader are not knurled for approximately ⅛ of an inch so as to reduce stress fractures at the cut end points of the loading leader. In the preferred embodiment, the non-slip loading leader is knurled along opposite edges of the loading leading but on opposite faces.

Knurling in the preferred embodiment is achieved ultrasonically as discussed in detail below. Other alternate suitable means, such as compression or heat knurling are also possible.

Non-slip leaders of the present invention may also be used as drive belts in computers, copy machines, etc, and in other similar applications.

BRIEF DESCRIPTION OF THE DRAWINGS

These and other objects of the present invention and the various features and details of the operation and construction thereof are hereinafter more fully set forth with reference to the accompanying drawings, where:

FIG. 6 is an enlarged sectional plan view taken along lines 6,6 of FIG. 2 and showing the loading wheel of the microfilm reader device in dot and dash lines.

FIG. 7 is an enlarged fragmentary side elevational view taken along lines 7,7 of FIG. 6.

FIG. 8 is a fragmentary sectional elevational view taken along lines 8,8 of FIG. 7.

FIG. 11 is a greatly enlarged fragmentary sectional view taken along lines 11,11 of FIG. 10.

FIG. 17 is a schematic front elevational view illustrating the method used for ultrasonically producing non-slip film leaders having a band of knurling adjacent one edge of one face of the leader and a similar band of knurling adjacent the opposite edge on the reverse face of the leader.

FIG. 18A is an enlarged fragmentary sectional plan view schematically illustrating a first station where a band of protrusions are being formed ultrasonically on one face of the leader adjacent a first edge.

FIG. 18B is a view similar to FIG. 18A but showing a second station where a band of protrusions are being formed ultrasonically on the reverse face of the leader and adjacent the edge opposite the first edge.

DETAILED DESCRIPTION OF THE PREFERRED EMBODIMENT

Figure 1:
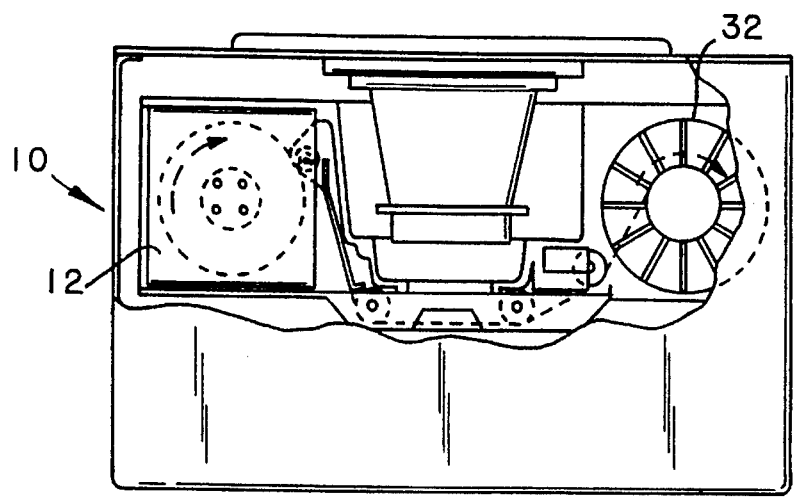
FIG. 1 is a semi-schematic plan view of a typical prior art microfilm reader device with a microfilm cartridge loaded for viewing of the microfilm.

FIG. 1 shows a typical conventional microfilm reader device, generally designated 10, with a microfilm cartridge 12 in the loaded position.

Figure 2:
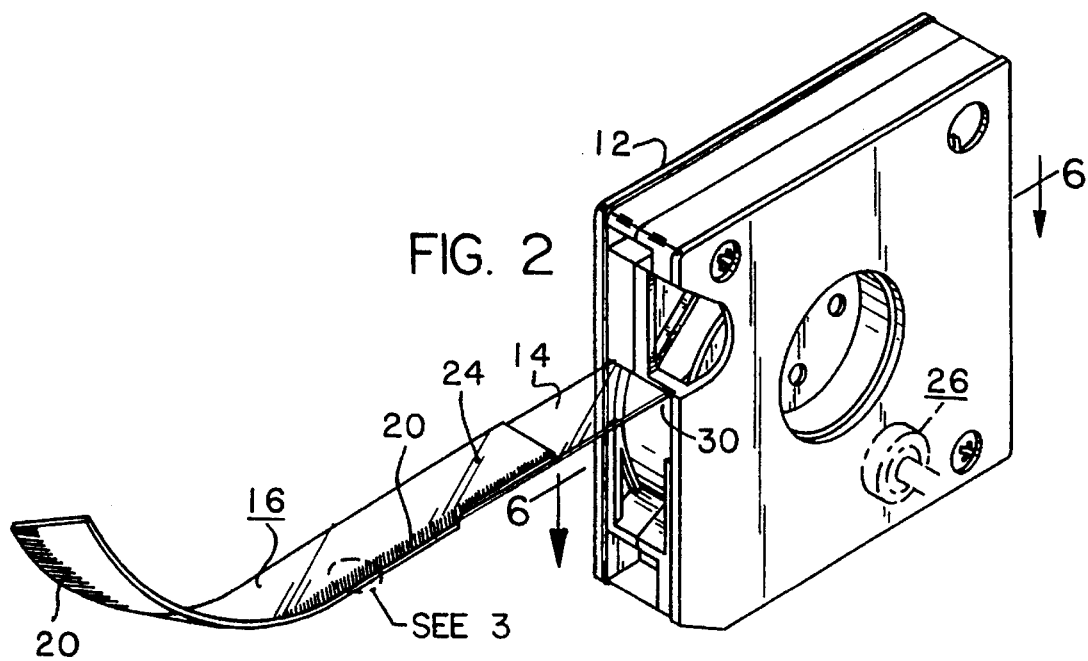
FIG. 2 is a perspective view of a conventional microfilm cartridge with a non-slip film leader of the present invention.
Figure 3:
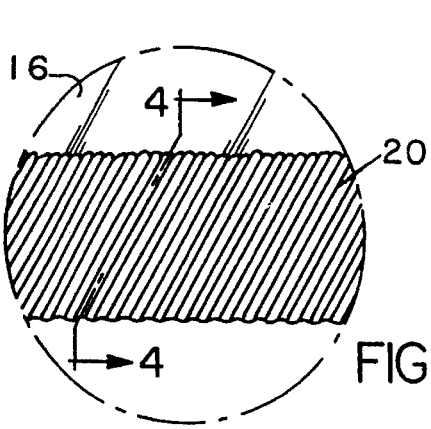
FIG. 3 is a greatly enlarged fragmentary plan view of the dot and dash circle of FIG. 2.

FIG. 2 shows the microfilm cartridge 12 with loaded microfilm 14 and the non-slip loading leader 16 made in accordance with the present invention.

Figure 4:
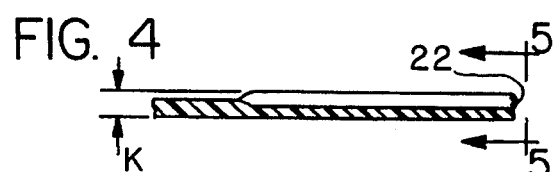
FIG. 4 is a sectional view taken along line 4,4 of FIG. 3.

The loading leader 16 is of such thickness to be semi-rigid, i.e. from 9–11 mm in thickness, and preferably 10 mm thick. The leader 16 is from 0.795" to 0.810" wide and is generally 0.800" wide. The width of the leader 16 is such that it rides on the exterior of the reel's radial walls 18 of a standard microfilm cartridge 12, such as a 3M™ Type Cartridge. The knurled portion 20 is, in the preferred embodiment, from 10.1 to 10.4 mm thick, measured from the top of the knurl to the bottom surface of the leader 16 as shown by the letter "K" in FIGS. 4 and 5. The knurling extends laterally from the edge of the leader 16 approximately 0.001" to 0.003" and this lateral extension is known as flash 22 as shown in FIG. 4. The tab end 24 is of a width such that it fits between the reel's radial walls 18. The tab end 24 of the leader 16 is affixed to the microfilm in a suitable manner, such as by gluing, taping, or ultrasonic welding.

The microfilm is mounted on the reel 28 by means of a starter leader (not shown). The reel in turn is rotatably mounted inside a cartridge 12. The starter leader is affixed to the opposite end of the microfilm 14 in a similar manner as the loading leader 16. The starter leader is then fixedly engaged to the hub of the reel 28, and the microfilm 14 is wound round the hub. The non-slip loading leader 16 is then attached to the microfilm 14 by its tab end 24 as previously discussed, and the non-slip loading leader 16 is wound round the reel 28 such that edges of the non-slip loading leader 16 rest on either reel radial wall 18 (see FIGS. 2, 6 and 8). Attachment of the loading leader 16 is simplified in that either side of loading leader 16 may be affixed to the microfilm 14 since the loading leader 16 is knurled on each surface, (see FIG. 2). The free end of the non-slip loading leader 16 is normally positioned within the confines of the cartridge 12.

When the information on the microfilm 14 within the cartridge 12 is desired to be reviewed, the cartridge 12 is inserted into a microfilm reader/printer 10. Within the microfilm reader/printer 10, the cartridge 12 is inserted such that a loading wheel 26, generally made of rubber, rests upon the knurled edge 20 of the non-slip loading leader 16 and presses this knurled edge 20 of the leader 16 against the outside reel radial wall edge 18 (See FIGS. 6, 7 and 8). The operator then engages the loading mechanism and the loading wheel 16 then rotates in a direction such that the microfilm 14 would unwind from the reel 28. The loading wheel 26 frictionally engages in a non-slip fashion on the knurled portion 20 of the loading leader 16, virtually eliminating slippage. As the loading wheel 26 rotates, the loading leader 16 is wound tight around the outside reel radial walls 18, causing rotation of the reel 28 and the free end of the non-slip loading leader 16 subsequently is exposed through the opening 30 in the cartridge 12. The free end is then guided out from the cartridge 12 through the cartridge opening 30 at an angle sufficient to contact the take-up reel 32 within the microfilm reader/printer 10. (See FIGS. 1, 6, 7 and 8).

The take-up reel 32 in the microfilm reader/printer 10 is of a similar shape to the cartridge reel, but the radial hub walls of the take-up reel 32 are spring loaded laterally, such that they increase the frictional engagement of the loading leader 16 as necessary. This lateral spring-loading also allows for loading leaders 16 wider than the distance between the reel radial walls 18 to be used in such microfilm reader/printers 10. Also, the interior of the take-up reel radial walls have ridges which radiate outwardly from the hub which also frictionally engage the loading leader 16 (see FIG. 1). The take-up 32 reel rotates with the loading wheel 26 such that when the non-slip loading leader 16 comes into contact with the take-up reel 32, the take-up reel's ridges frictionally engage the outside edges of the loading leader 16, causing the loading leader 16 to wrap around the hub of the take-up reel 32. The operator disengages the loading mechanism once the loading leader 16 is sufficiently frictionally engaged with the take-up reel 32 such that the loader leader 16, and hence the microfilm 14, is loaded onto the take-up reel 32.

The preferred 10 mm thickness of the loading leader 16 is required to provide a sufficient lateral rigidity such that the loading leader 16 may force apart the laterally spring loaded take-up reel radial walls as necessary. The 0.001" to 0.003" flash 22 provides for increased frictional engagement of the non-slip loading leader edges with the ridges on the microfilm reader/printer take-up reel 32.

Figure 9:
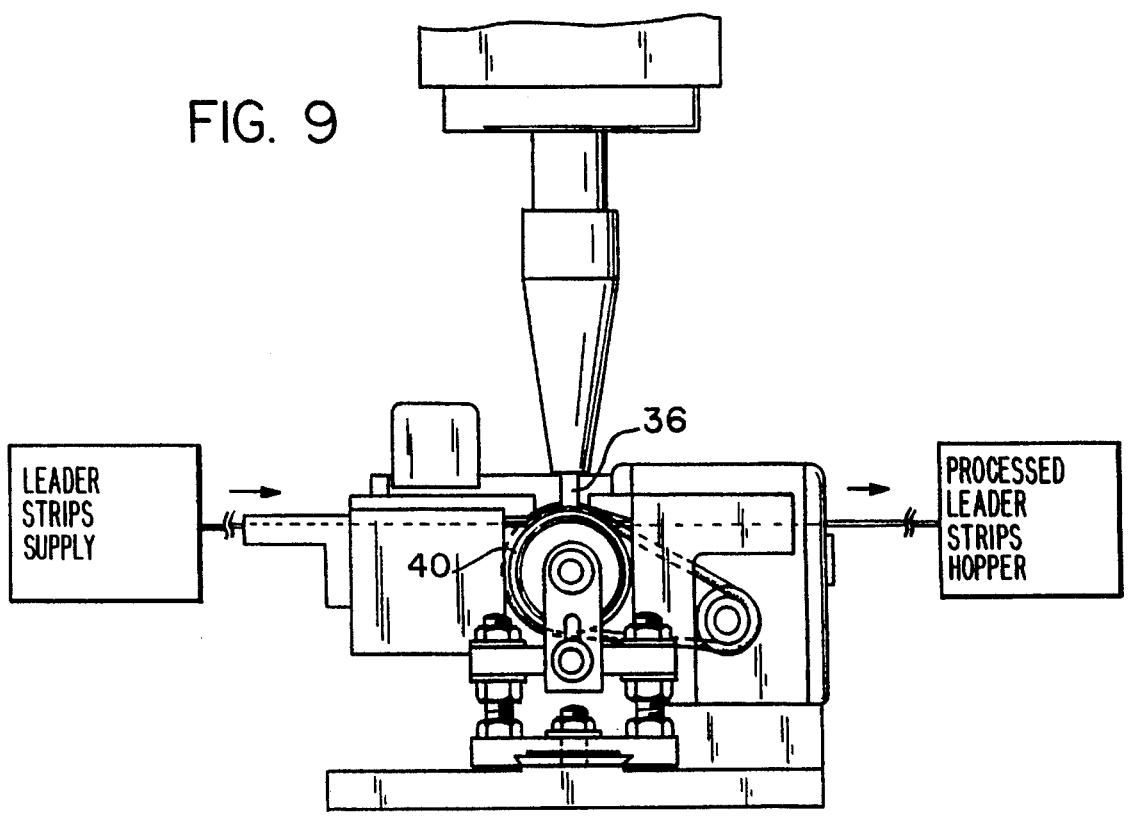
FIG. 9 is a front elevational view of a device for ultrasonically producing non-slip film leaders in accordance with the present invention.
Figure 10:
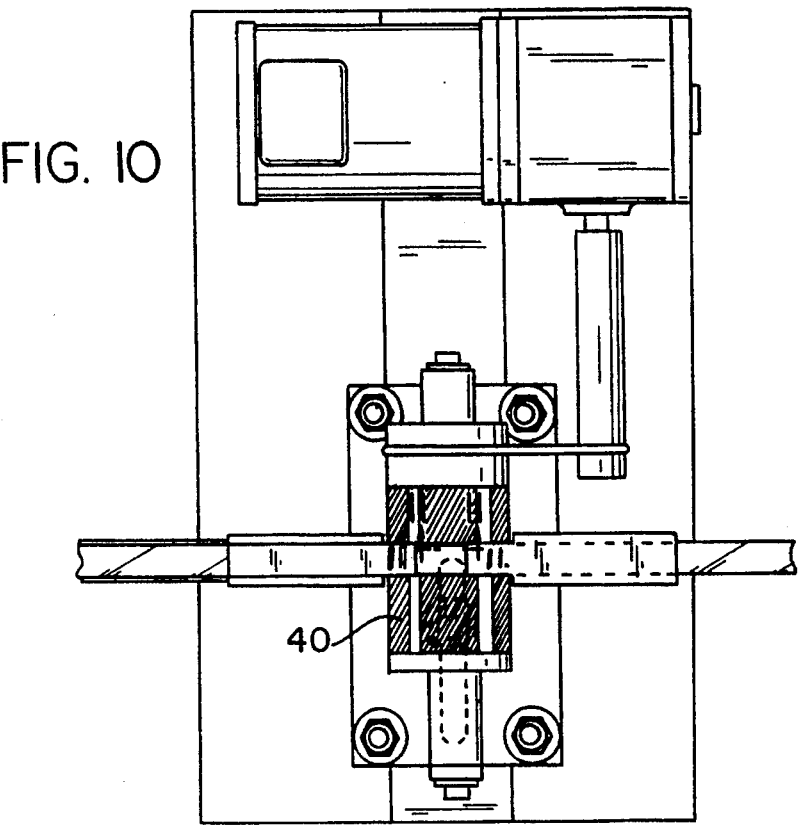
FIG. 10 is a plan view of the device shown in FIG. 9.
Figure 12:
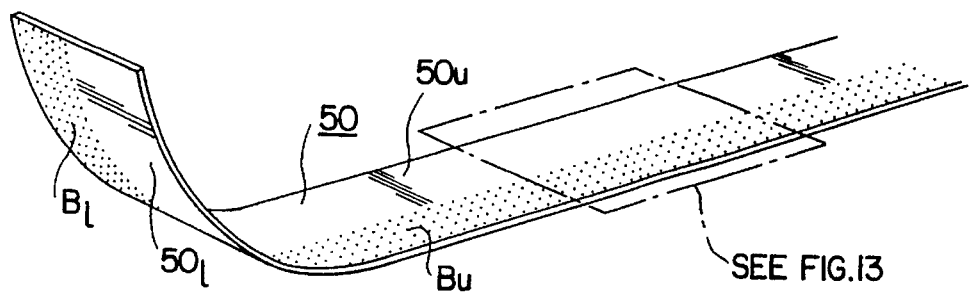
FIG. 12 is a prospective view of another embodiment of non-slip film leader in accordance with the present invention.
Figure 13:
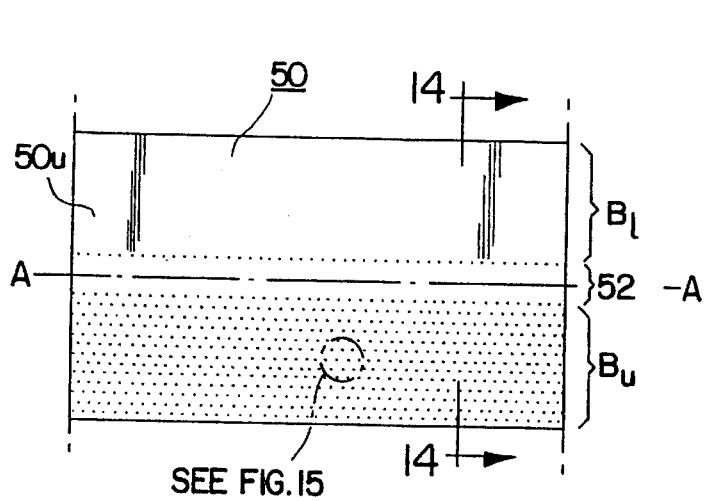
FIG. 13 is a fragmentary enlarged plan view of a section of the film leader.
Figure 14:
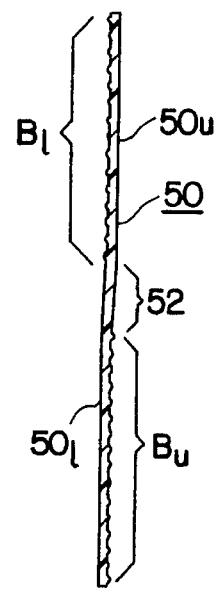
FIG. 14 is a sectional view taken on lines 14—14 of FIG. 13.
Figure 15:
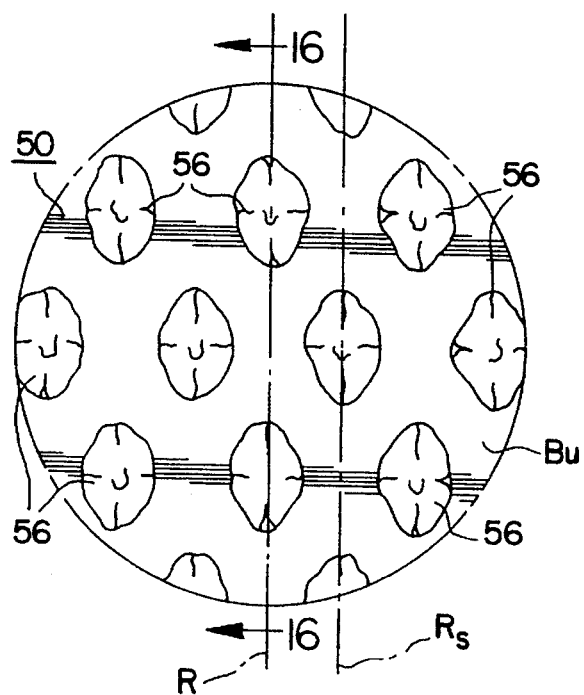
FIG. 15 is an enlarged view of the circled portion of FIG. 13.
Figure 16:
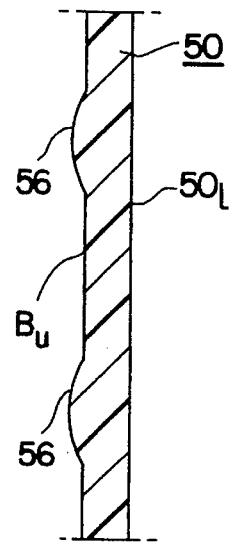
FIG. 16 is a sectional view taken on lines 16—16 of FIG. 14.

The process of knurling leaders 16 is shown in FIGS. 9–10. The knurling of the non-slip film leader 16 is preferably done ultrasonically. A reel of polyester or other thermoplastic strip material is either pre-cut into appropriate standard leader lengths and individually knurled, or an entire reel of polyester loading leader material is knurled, and then the individual loading leaders 16 are cut from this knurled reel. A transducer, which vibrates at approximately 2100 times per second, is attached to a tool 36 which, at its free end 38, is flattened and has a hardened coating. The tool 36 may be made of aluminum, although titanium is preferred. Tuff™ Coating material may be used as the coating on the free end 38 of the tool. The free end 38 of the tool is positioned approximately 0.003" to 0.005" from a wheel 40 which is knurled on its exterior radial surface as shown in FIG. 11. The loading leader material is fed between the tool 36 and the knurled wheel 40 such that approximately 25% of the edge of the film leader engages the knurled wheel 40 as shown in FIG. 10. As the leader passes between the knurled wheel 40 and the vibrating tool 36, the ultrasonic vibrations of the tool 36 cause the film leader material to be heated. The film leader material melts, and flows between the ridges of the knurled wheel thus assuming the shape of the knurled wheel 40 as shown in FIG. 11. The rotation of the knurled wheel 40 feeds the film leader material between the tool 36 and the knurled wheel 40. The knurled film leader 16 is then rewound on a take-up reel, or, if the loading leaders have been precut, the loading leaders are then deposited in a receptacle or hopper (see FIG. 9).

Figure 5:
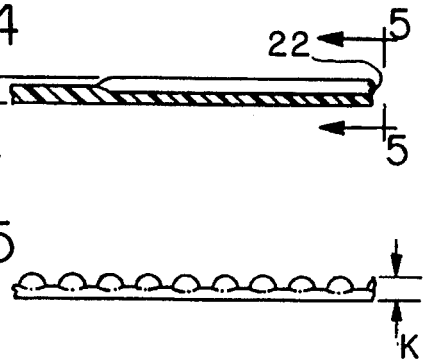
FIG. 5 is an enlarged fragmentary side elevational view taken along lines 5,5 of FIG. 4.

The individual knurls on the knurled portion 20 generally have flattened ridges, as shown in FIGS. 5 and 11, which increase the surface area in contact with the loading wheel 26 during the loading of the microfilm into the microfilm reader/printer 10. This further increases the frictional engagement with the loading wheel 26 and further minimizes slippage.

Although the preferred embodiment uses ultrasonic knurling, heat or pressure knurling may also produce the desire knurled film loader leaders of the present invention.

There is shown in FIGS. 12–16 inclusive, another embodiment of leader in accordance with the present invention generally designated by the numeral 50. In accordance with this embodiment of the invention, the leader has a band of knurling running along the upper face $50_u$ generally designated by $B_u$ which preferably extends approximately about 40% of the width of the upper face $50_u$ of the leader. The lower face of the leader likewise has a band of knurling designated $B_1$ extending from the outer edge inwardly and extends preferably about 40% of the width of the lower face $50_1$ thereby defining an unknurled center strip 52 comprising about 20% of the width of the leader. For example, leaders are typically about 0.81 inches in width and the upper and lower bands $B_u$ and $B_1$ in the preferred form extend and have a width-wise dimension of about 0.339 inches leaving a center band 52 of about 0.132 inches. In the present instance, the knurling is in the form of arcuate protuberances 56 of generally oval shaped configuration arranged in rows R and $R_s$ extending generally perpendicular to the longitudinal axis A—A of the leader. The protrusions 56 in the adjacent rows R and $R_s$ are staggered as illustrated. It has been found that this array provides a very effective gripping action with the loading wheel 26 and produces straight feeding of the leader during the loading operation. The knurling resists cocking of the leader during the feeding operation. Further, the formation of the toughened areas leaving a center strip adds strength to the leader resisting tearing and the like. This produces a leader having a long service life.

The method for making film leaders of the type shown in FIGS. 12–16 inclusive or FIGS. 1–5, is illustrated schematically in FIGS. 17 and 18A and B. As illustrated therein, a polyester or other thermoplastic strip material is fed from a supply roller 70 through guide rollers 72 and 74 through a first knurling station comprising an engraving roller 76 and an ultrasonic tool 78. Ultrasonic tool is a vibrating tool of the type described above wherein the ultrasonic vibrations of the tool ,cause the film leader material to be heated and as the film passes over the engraving roller, the band of protrusions on the upper face are formed on the leader. The system also includes a take-up roll 80 located downstream of the first knurling station. As illustrated, the film material as it leaves the first engraving station, passes through a second engraving station comprising an ultrasonic tool 82 and an engraving roller 84. The reverse path of the film through the system presents the opposite or lower face of the leader to the engraving roller 84 to thereby form the protrusions on the opposite face of the leader and adjacent the opposite edge to produce the leader as shown in FIGS. 12–16 inclusive. The processed film leader on the take up roll may then be either stored or processed further by cutting it into appropriate lengths forming the desired nonslip loading leaders of the present invention.

While particular embodiments of the present invention have been illustrated and described herein, it is not intended to limit the invention, and changes and modifications may be made therein within the scope of the following claims.

What is claimed is:

1. A film leader device for use with microfilm, comprising:
   a) an elongated generally rectangular strip of plastic material having generally parallel opposing side edges and top and bottom faces;
   b) means defining knurling of a predetermined pattern on at least a portion of said top face and covering only the area adjacent one side edge thereof; c) means defining knurling of a predetermined pattern on at least a portion of the lower face and covering only the area adjacent a side edge thereof opposite said one side edge of the top face; and d) means defining an unknurled zone at the center of the strip between the knurling on the top and bottom faces; the transverse width of the unknurled zone being less than the transverse width of the knurled zone on the top or bottom face.

2. A film leader as claimed in claim 1 wherein the knurling on the upper face extends inwardly from an outerside edge thereof and extends approximately 40% of the width of the leader and wherein the knurling on the lower face extends inwardly from the opposing outer edge of the leader and covers approximately 40% of the lower face.

3. A film leader as claimed in claim 1 made of a polyester material.

4. A film leader as claimed in claim 1 wherein the knurling is formed ultrasonicly.

5. A film leader as claimed in claim 1 wherein the knurling comprises a plurality of arcuate protrusions extending in rows generally perpendicular to the longitudinal axis of the leader.

6. A film leader as claimed in claim 5 wherein the arcuate projections of adjacent rows are staggered relative to one another.

* * * * *

UNITED STATES PATENT AND TRADEMARK OFFICE
CERTIFICATE OF CORRECTION

PATENT NO. : 5,491,014
DATED : February 13, 1996
INVENTOR(S) : Vincent J. Ranoia et al It is certified that error appears in the above-indentified patent and that said Letters Patent is hereby corrected as shown below:

In column 6, line 23, the word "toughened" should read --roughened--.

Signed and Sealed this

Eleventh Day of June, 1996

*Attest:*

BRUCE LEHMAN

*Attesting Officer*    Commissioner of Patents and Trademarks